United States Patent [19]

Hirayama

[11] Patent Number: 5,199,104
[45] Date of Patent: Mar. 30, 1993

[54] ELECTRONIC ORGANIZER WITH ELECTRONIC BOOK MARKER

[75] Inventor: Tomoshi Hirayama, Tokyo, Japan

[73] Assignee: Sony Corporation, Tokyo, Japan

[21] Appl. No.: 440,258

[22] Filed: Nov. 22, 1989

[30] Foreign Application Priority Data

Dec. 15, 1988 [JP] Japan ................. 63-316838
Dec. 27, 1988 [JP] Japan ................. 63-330138

[51] Int. Cl.[5] ........................................... G06F 15/20
[52] U.S. Cl. .................................................... 395/145
[58] Field of Search ................ 364/705.06, 705.07, 364/705.08, 709.12; 395/145, 155, 156

[56] References Cited

U.S. PATENT DOCUMENTS

| | | | |
|---|---|---|---|
| 4,715,010 | 12/1987 | Inoue et al. | 364/705.06 |
| 4,890,258 | 12/1989 | Tsugei et al. | 364/900 |
| 4,912,640 | 3/1990 | Tsugei | 364/400 |
| 5,008,854 | 4/1991 | Maeda et al. | 364/705.06 X |

FOREIGN PATENT DOCUMENTS

| | | |
|---|---|---|
| 0251477 | 1/1988 | European Pat. Off. . |
| 3520894 | 12/1985 | Fed. Rep. of Germany . |
| WO89/01658 | 2/1989 | PCT Int'l Appl. . |
| 2183886 | 12/1985 | United Kingdom . |

OTHER PUBLICATIONS

"Selecting a Daily Calendar From a Monthly Calendar", J. P. Vincent and M. E. Weidmann, IBM Technical Disclosure Bulletin, vol. 26, No. 8, Jan. 1984.

Primary Examiner—Heather R. Herndon
Attorney, Agent, or Firm—Hill, Steadman & Simpson

[57] ABSTRACT

A portable computer has incorporated therein a central processing unit, a display apparatus and a timer circuit. This portable computer is also provided with exclusive operation keys, wherein image data corresponding to a predetermined condition can be displayed on the display apparatus only by depressing the predetermined exclusive operation key and schedule data judged from a date of present time point can also be displayed on the display apparatus only be depressing the predetermined exclusive operation key.

5 Claims, 5 Drawing Sheets

ELECTRONIC ORGANIZER WITH ELECTRONIC BOOK MARKER

BACKGROUND OF THE INVENTION

1. Field of the Invention

The present invention relates generally to portable computers and, more particularly, is directed to a portable computer which incorporates therein a central processing unit (CPU) for controlling schedule data and a display for displaying the schedule data.

2. Description of the Prior Art

A portable computer has been proposed so far, which incorporates therein a central processing unit (CPU) for controlling schedule data and a display portion for displaying the schedule data.

According to this previously-proposed portable computer, when the user wants to see and compare schedules on two different dates, the user has to operate keys to input two dates alternately to access schedules of respective dates. This requires a very cumbersome operation to compare schedules of two dates.

Further, when the user wants to see desired data and the like, the user has to input a particular keyword in the data and to retrieve desired data and the like. Thus, when the user wants to see the desired data very often, these operations are very cumbersome for the user. Also, particular data and so on can not be accessed immediately.

Furthermore, when the user wants to see a schedule of "today", the user has to operate an exclusive key of date of "today" to access the schedule of "today". In that case, however, the user has to operate a plurality of keys such as year key, month key, day key and the like. Further, the user has to operate a "retrieval key", a "check key" and so on. Therefore, the user can not check the schedule of "today" without very cumbersome operations.

OBJECTS AND SUMMARY OF THE INVENTION

Accordingly, it is an object of the present invention to provide an improved portable computer which can eliminate the defects encountered with the prior art.

More specifically, it is an object of the present invention to provide a portable computer in which the user can see a page corresponding to a predetermined condition only by depressing an exclusive operation key.

It is another object of the present invention to provide a portable computer in which the user can see a predetermined schedule only by depressing an exclusive operation key.

According to an aspect of the present invention, there is provided a portable computer, comprising:

control means for controlling input data as a unit of page according to a program;

memory means for storing said input data;

display means for displaying an image of said input data as each said page; and an exclusive operating key for generating a signal which detects one of said pages corresponding to a predetermined condition, wherein said control means outputs an image corresponding to said detected page by the signal from said memory means, and displays said image on said display means.

According to other aspect of the present invention, there is provided a portable computer, comprising:

control means for controlling input data as a unit of page according to a program;

memory means for storing said input data;

display means for displaying an image of said input data as each said page; and an exclusive operating key for generating a signal which be stored at a logic address corresponding to said page displayed on said display means into a predetermined address area of said memory means, wherein said control means outputs said logic address of said page from said predetermined address area by operating said key, and displays said image on said display means.

According to a further aspect of the present invention, there is provided a portable computer, comprising:

control means for controlling input schedule data according to a program;

memory means for storing said schedule data, display means for displaying an image of said schedule data;

timer means for counting data of date and time-of-day; and an exclusive operating key for generating a signal which detects one of said schedule data corresponding to a predetermined condition, wherein said control means detects data of date and time-of-day corresponding to said condition by operating said key, and outputs schedule data corresponding to said date and time-of-day from said memory.

According to a yet further aspect of the present invention, there is provided a method of controlling a portable computer which controls input data as a unit of page according to a program, comprising the steps of:

a first step for outputting a logic address of said page corresponding to a predetermined address area of memory means from said memory means by an exclusive operating key;

a second step for outputting an image of said page corresponding to said logic address from said memory means; and a third step for displaying said image output.

According to a still further aspect of the present invention, there is provided a method of controlling a portable computer which controls input data as a schedule data by a program, comprising the steps of:

a first step for detecting a predetermined condition by operating an exclusive key;

a second step for detecting a date and a time-of-day from a timer apparatus in accordance with said condition;

a third step for outputting a schedule in accordance with said date and said time-of-day; and a fourth step for displaying said schedule on display means.

The above, and other objects, features and advantages of the present invention, will be apparent in the following detailed description of a preferred embodiment of the invention when read in conjunction with the accompanying drawings, in which like reference numerals are used to identify the same or similar parts in the several views.

BRIEF DESCRIPTION OF THE DRAWINGS

The accompanying drawings show the preferred embodiment of the invention in which.

DETAILED DESCRIPTION OF A PREFERRED EMBODIMENT

A portable computer according to an embodiment of the present invention will now be described in detail with reference to the drawings.

Figure 1:
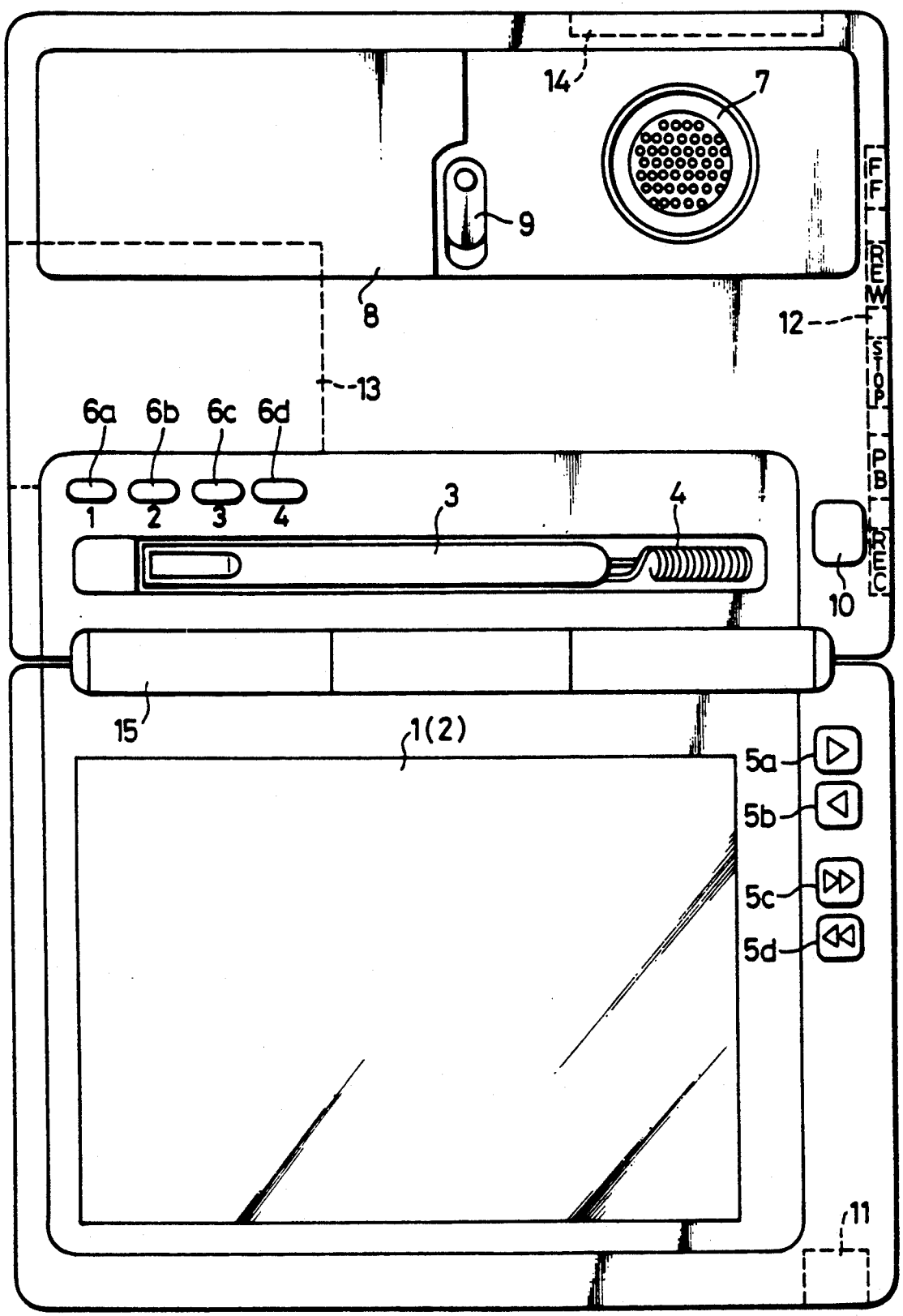
FIG. 1 is a front view of a portable computer according to an embodiment of the present invention.

FIG. 1 shows a front view of a portable computer according to an embodiment of the present invention. Referring to FIG. 1, there is shown a display portion 1. This display portion 1 is formed of a liquid crystal display (LCD) device or the like, and displays thereon image data derived from a central processing unit (CPU) which will be explained later. A so-called input tablet 2 is formed of a so-called transparent touch sensor or the like, and is provided on the surface of the display portion 1. A tablet pen 3 is placed on the front wall of the portable computer and is used to input desired data in cooperation with the input tablet 2. When the user takes the tablet pen 3 and touches the input tablet 2 with the point of the tablet pen 3, an information such as a touched position is supplied through a cord 4 or the like to the CPU, thereby inputting desired data. Predetermined keys 5a, 5b, 5c, 5d and 6a, 6b, 6c, 6d are shown, and signals from these keys are also supplied to the CPU.

In FIG. 1, reference numeral 7 designates a speaker and 8 a battery accommodating portion. In the battery accommodating portion 8, a power source battery (not shown) is accommodated inside of the battery accommodating portion 8 under a lid which is openable and/or closable by operating a locking mechanism 9. This portable computer is powered ON and/or OFF by a power switch 10.

Block portions shown by phantoms in FIG. 1 respectively show positions of various mechanisms provided on the side wall of the portable computer, wherein a broken-line block 11 designates a microphone and a broken-line block 12 designates an operation key used to effect so-called solid state IC recording which will be described later. When the key 12 is operated, an audio signal supplied to the microphone 11 is recorded and emanated from the above-mentioned speaker 7. Further, a broken-line block 13 designates an IC card socket with which IC cards such as read only memory (ROM), random access memory (RAM) or the like are connected. A broken-line block 14 denotes a socket to which is connected an external apparatus or the like in order to expand the system of this portable computer.

A hinge 15 is shown to incorporate therein a flexible substrate or the like to transmit signals. Owing to this hinge 15, the user can fold the portable computer in two without electrical interference. Upon use, this portable computer is about 29 cm high and about 20.5 cm wide in the extended state. In the folded state, the portable computer is about 4 cm thick and the size of the display portion 1 is about 15 cm×10 cm.

Figure 2:
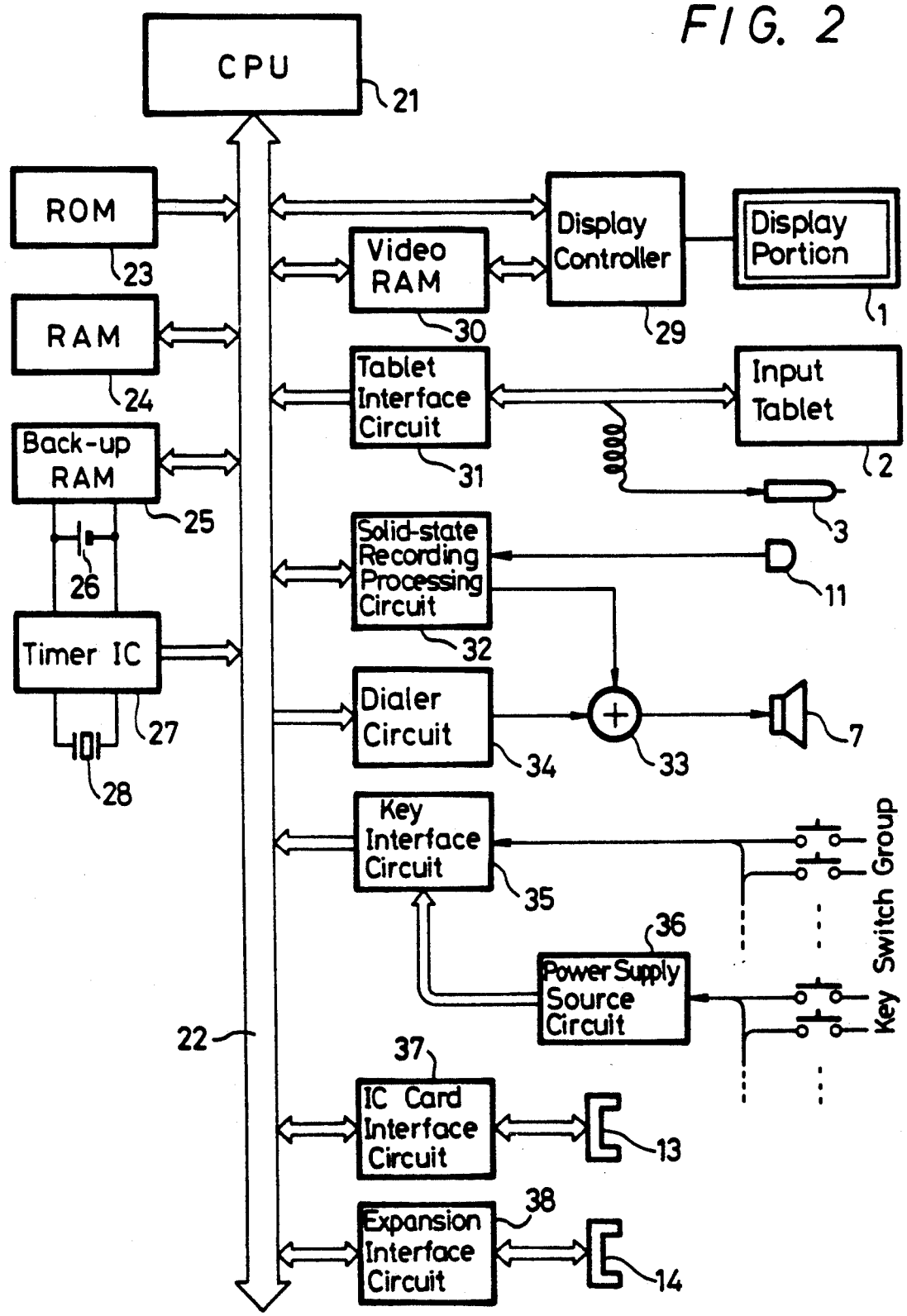
FIG. 2 is a block diagram showing an arrangement of a hardware of the portable computer shown in FIG. 1.

In the portable computer of the invention, an arrangement of a hardware incorporated is represented in a block diagram forming FIG. 2.

In FIG. 2, it will be seen that a central processing unit (CPU) 21 is connected through a bus line 22 to various kinds of function ICs which will be explained hereinbelow. A read only memory (ROM) 23 is shown to store therein, in addition to system program of the whole portable computer, Japanese kana-kanji converting program for word processor function in Japanese language, dictionary data for such kanji-kana conversion, program for recognizing hand-written input data, dictionary data for such recognizing program.

In FIG. 2, reference numeral 24 designates a RAM for a work area and 25 a back-up RAM provided with a power supply source 26. A timer IC 27 is driven by the power supply source 26, and counts a clock from a quartz oscillator 28 to constantly generate data of date and time at a certain time point.

The following elements are associated with the interconnection to the respective portions shown in the above-mentioned front view forming FIG. 2, and will be explained.

A display controller 29 is adapted to control the display portion 1. The display controller 29 is controlled by the CPU 21, and display data formed by the CPU 21 is written in a video-RAM 30. The data written in the video-RAM 30 is supplied to the display portion 1 via the display controller 29.

An interface circuit 31 is connected to the input tablet 2 and to the tablet pen 3, and data written on the input tablet 2 is supplied to the CPU 21 via the interface circuit 31.

A solid state recording processing circuit 32 is adapted to process an audio signal from the microphone 11 in a predetermined signal processing manner such as an analog-to-digital (A/D) conversion and the like. The audio signal thus processed is stored in the back-up RAM 25 via the CPU 21. The audio signal data stored in the back-up RAM 25 is supplied to the processing circuit 32, in which it is digital-to-analog (D/A) converted, and the analog audio signal data is supplied through a mixer 33 to the speaker 7.

A so-called dialer circuit 34 is provided to generate an acoustic signal corresponding to a dual tone of a so-called push-type phone when supplied with data such as a desired telephone number and the like from the CPU 21. The acoustic signal from the circuit 34 is supplied through the mixer 33 to the speaker 7.

A key interface circuit 35 is shown to receive a signal supplied directly or via a power supply source circuit 36 from key group such as the above-mentioned keys 5a to 5d, 6a to 6d, 10 and 12. The predetermined, converted signal is supplied from the key interface circuit 35 to the CPU 21. The power switch 10, the keys 6a to 6d and key 12 except the stop button are connected to the interface circuit 35 via the power supply source circuit 36, whereby when these keys are operated, the power supply source circuit 36 is actuated, and information corresponding to the key operation is then fed therefrom to the interface circuit 35.

An IC card interface circuit 37 is connected to the socket 13 to supply data from the IC card through the bus line 22 to the CPU 21. An interface circuit 38 is connected to the bus line 22 and to the socket 14 to expand the system of this portable computer.

Figure 3:
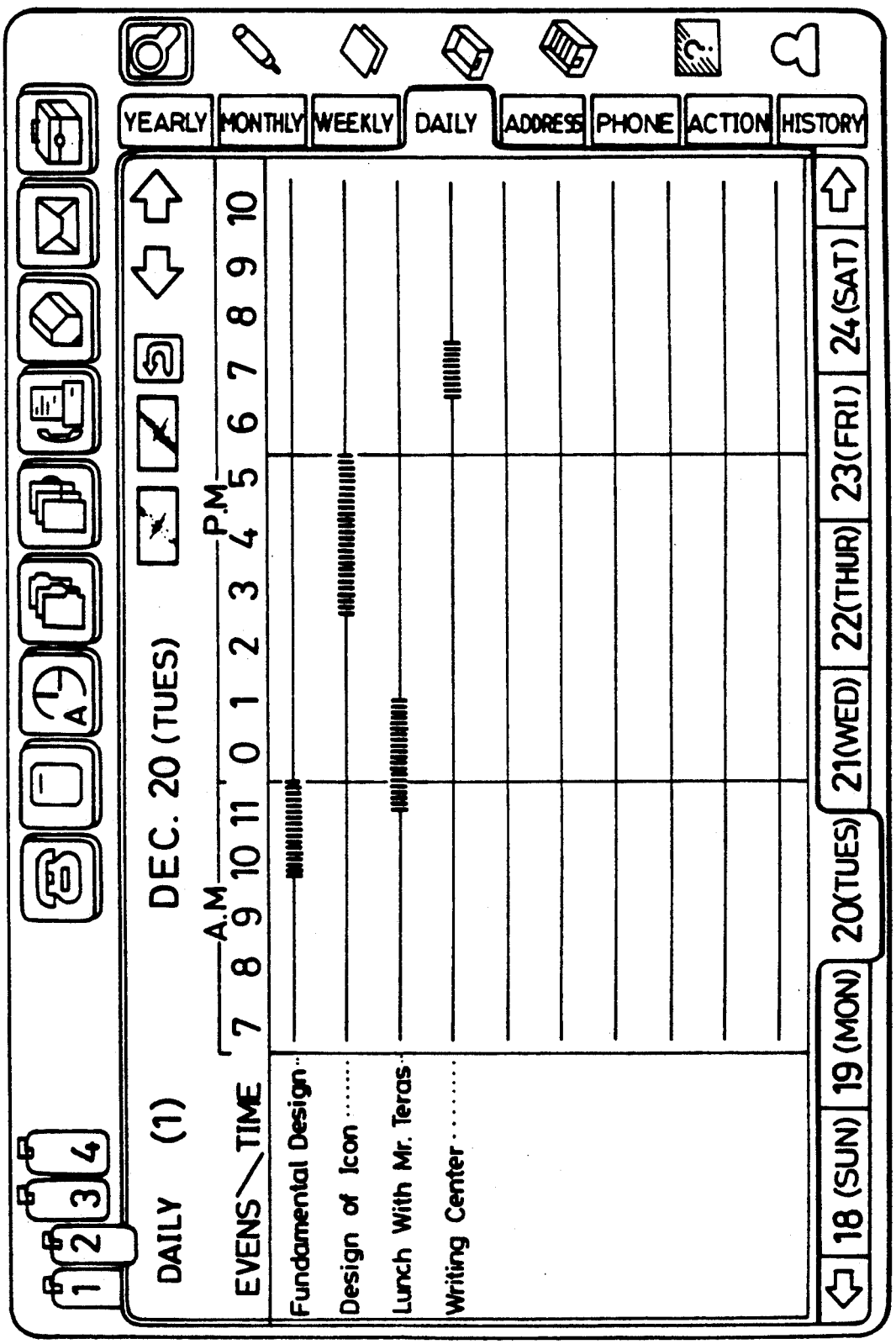
FIG. 3 is a pictorial representation of an example of a picture displayed on a display screen of the portable computer of the present invention.

According to this portable computer, if any one of the keys 6a to 6d, for example, the key 6b is depressed under the condition that image indicating the schedule of "today" is displayed on the display portion 1 as, for example, shown in FIG. 3, then the logic address of the page displayed will be stored in a predetermined address area of the back-up RAM 25. The thus stored condition is represented when a "bookmarker" on, for example, the upper left corner of the display portion 1 is inserted as [2]. Thus, a desired page is opened hereinafter. Then, if the key 6b is depressed, the stored logic address data will be read from the predetermined address area of the back-up RAM 25, thereby displaying the page indicated by the read logic address data.

Figure 4:
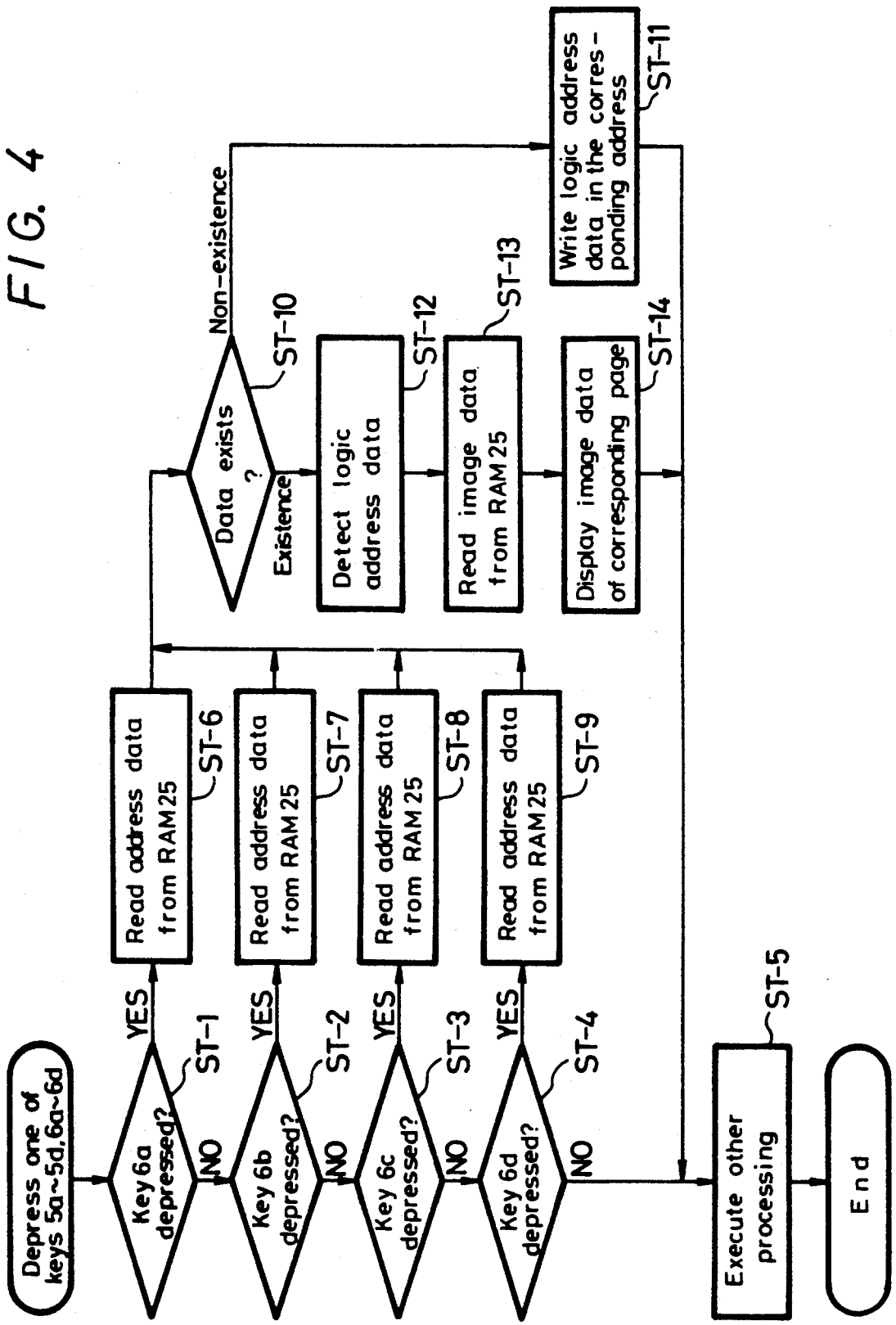
FIG. 4 is a flow chart to which reference will be made in explaining the operation of the present invention.

More specifically, a routine shown in a flow chart of FIG. 4 is provided in the system program which is written in the ROM 23.

Referring to FIG. 4, when any one of the afore-mentioned keys 5a to 5d and 6a to 6d is depressed, the operation is started. Then, it is determined in each of decision steps ST-1 to ST-4 whether or not any one of the keys 6a to 6d is depressed. If a NO is output in all steps ST-1 to ST-4, then the routine proceeds to step ST-5, whereat other processing is executed. At the completion of the processing in step ST-5, the routine is ended. If a YES is output in any one of steps ST-1 to ST-4, corresponding address data stored in the back-up RAM 25 are read in steps ST-6 to ST-9. Further, existence or non-existence of data is judged in the next decision step ST-10. If it is determined in step ST-10 that no data exists, then the routine proceeds to step ST-11, whereat logic address data of page displayed at that time is written in the corresponding address area of the RAM 25. If it is determined in step ST-10 that data exists, then the routine proceeds to step ST-12, whereat the logic address data of the data is detected. Then, the routine proceeds to step ST-13, in which image data of page corresponding to the logic address data is read from the back-up RAM 25, and an image of corresponding page is displayed on the display portion 1 in step ST-14.

Therefore, according to the portable computer of the present invention, when the keys 6a to 6d are operated, a character of bookmarker) is inserted into the page opened at that time. When the same keys 6a to 6d are operated under the condition that other page is opened, the page indicated by the character of [bookmarker] can be accessed immediately. Thus, the user can operate this portable computer as if the user had slipped the bookmarker between the pages of the book. Thus, when the user puts [bookmarkers] in pages of two dates, the user can compare these pages by alternately opening them. Also, when the user puts the [bookmarkers] in the pages of data which are used very often, the user can readily see these pages with ease.

According to the above-mentioned portable computer, as described above, the user can see the page corresponding to the desired condition (marked with the [bookmarker]) only by depressing desired one of exclusive operations keys (keys 6a to 6d). Thus, the operation of the portable computer of this invention can be carried out with great ease (only by one operation).

Further, according to the above-mentioned portable computer, if any one of the keys 6a to 6d is depressed under the condition that the page, marked with the bookmarker], is displayed on the display portion 1, then data on the corresponding address area of the RAM 25 will be erased and the [bookmarker] inserted may be removed.

The operation by the above-mentioned keys 6a to 6d is not limited to the bookmarker and the above keys 6a to 6d may be operated in cooperation with, for example, the timer IC 27 so that a page of schedule such as data of "today" may be accessed. Alternatively, the preceding page displayed during a period of more than a predetermined time may be accessed or when the pages of the whole system of the portable computer are classified as several items, the first page, the last page and the blank page of the displayed item may be accessed.

According to the present invention, the user can see the page corresponding to the desired condition only by depressing desired one of the exclusive operating keys. and thus the portable computer of the present invention can be operated with great ease.

The operation of the portable computer will further be explained with reference to a flow chart forming FIG. 5. That is, a flow chart of FIG. 5 is prepared in the system program written in the ROM 23.

Figure 5:
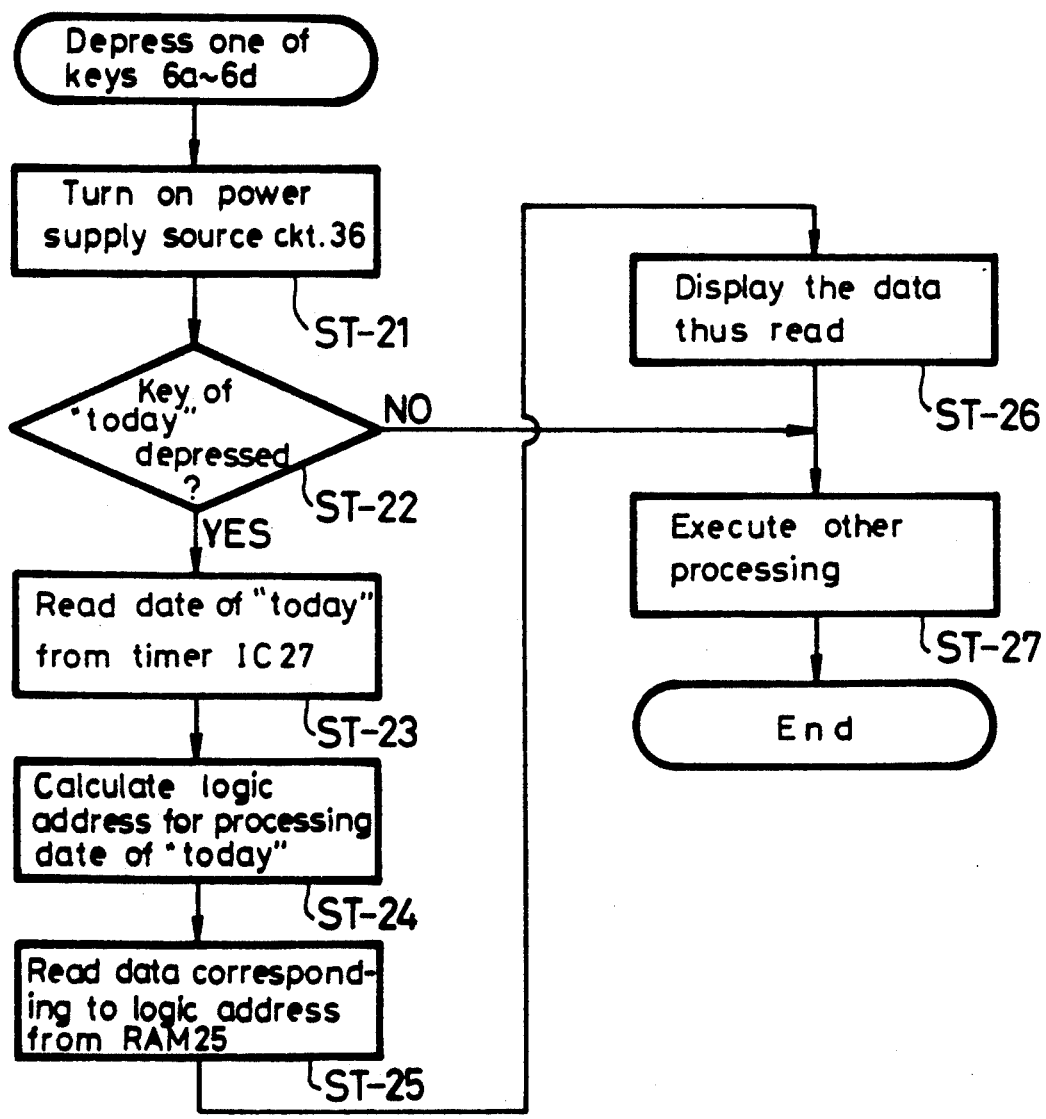
FIG. 5 is a flow chart to which reference will be made in explaining the operation of the present invention.

Referring to FIG. 5, when any one of the above keys 10, 6a to 6d and 12 is operated, the operation is started, and the power supply source circuit 36 is actuated at step ST-21. In the next decision step ST-22, it is determined whether or not "today" is set in the depressed key. If a YES is output at step ST-22, then the routine proceeds to step ST-23, in which date of "today" is read from the timer IC 27. In the next step ST-24, logic address for internally processing date of today read is calculted, and in step ST-25, data corresponding to this logic address is read from the RAM 25, and the data thus read is displayed on the display portion 1 at step ST-26. Then, other data processing is performed in step ST-27, and at the completion of the processing in step ST-27, the routine is finished (ended). If a NO is output at step ST-22, then the routine directly proceeds to step ST-27, whereat other data processing is performed as described above.

According to the portable computer of the present invention, the user can see the schedule of a predetermined date (today) only by depressing desired one of the exclusive operating keys (for example, key 6a). Therefore, the portable computer of the invention can be operated with great ease (only by one operation).

In the portable computer of the invention as described above, the operation by the key 6a is similarly performed even after the power supply source circuit 36 was already actuated by other key. The user can see the schedule of "today" by depressing the key 6a during other operations.

Further, schedule data of "yesterday" and of "tomorrow" are set in the keys 6b to 6d other than the key 6a in which schedule data of "today" is set, whereby the user can see these schedule data. Furthermore, days are set in the keys 6a to 6d, whereby the user can see schedule data of particular day and so on.

According to this invention, as set forth above, the user can see the predetermined schedule data only by depressing desired one of exclusive operating keys. Therefore, the portable computer of the invention can be operated with great ease.

Having described a preferred embodiment of the invention in detail with reference to the accompanying drawings, it is to be understood that the invention is not limited to that precise embodiment and that many changes and modifications could be effected by one skilled in the art without departing from the spirit and scope of the invention as defined in the appended claims.

I claim as my invention:

1. An electronic organizer, comprising:
   computer control means for controlling and organizing data, the data being organized as pages in a book;

input means coupled to the computer control means for entering data into the electronic organizer;

memory means coupled to the computer control means for storing said data;

display means coupled to the control means and the memory means for displaying at least one page of data; and an exclusively dedicated operating key operatively coupled to the computer control means for placing and removing at least one electronic bookmark on a page of data so that the page of data so marked can be immediately accessed by actuation of said key.

2. An electronic organizer, comprising:

computer control means for controlling and organizing data, the data being organized as pages in a book;

input means coupled to the computer control means for entering data into the electronic organizer;

memory means coupled to the computer control means for storing said data;

display means coupled to the control means and the memory means for displaying at least one page of data; and an exclusively dedicated operating key operatively coupled to the computer control means for placing and removing at least one electronic bookmark on a page of data so that the page of data so marked can be immediately accessed by actuation of said key, the bookmark comprising a memory within which is stored a logic address corresponding to a memory address at which said page of data is stored.

3. An electronic organizer, comprising:

computer control means for controlling and organizing schedule data, the schedule data being chronologically data organized as pages in a diary;

input means coupled to the computer control means for entering data into the electronic organizer;

memory means for storing data;

display means coupled to the control means and the memory means for displaying at least one page of data at a time;

timer means for generating internal date data; and an exclusively dedicated operating key operatively coupled to the control means and the timer means for causing display of schedule data having a data associated therewith matching the internal date data generated by the timer means.

4. A method of controlling an electronic organizer which controls and organizes data, the data being organized as pages in a book, comprising the steps of:

actuating an exclusively dedicated operating key;

generating a logic address;

accessing a memory location determined by said logic address;

retrieving a page of data corresponding to said logic address from said memory; and displaying an image corresponding to said page of data.

5. A method of controlling an electronic organizer which controls and organizes schedule data, the data being organized as pages in a diary and stored in a memory, comprising the steps of:

actuating an exclusively dedicated operating key;

detecting actuation of the exclusively dedicated operating key;

generating date data with a timer means;

generating a logic address based on the date data if the extensively dedicated key was actuated; and retrieving schedule data associated with a date matching the date data.

* * * * *